United States Patent [19]
Hoffmann

[11] 3,985,488
[45] Oct. 12, 1976

[54] MATERIAL GUIDE JAW FOR TWO CO-OPERATING ROLLS OF A ROLLING MILL OR CALENDER

[75] Inventor: Manfred Hoffmann, Hannover, Germany

[73] Assignee: Hermann Berstorff Maschinenbau GmbH, Kleefeld, Germany

[22] Filed: Nov. 10, 1975

[21] Appl. No.: 630,725

[30] Foreign Application Priority Data
Nov. 28, 1974 Germany............................ 2456251

[52] U.S. Cl.............................. 425/363; 425/337; 425/367
[51] Int. Cl.².................... B29C 15/00; B29D 7/14; B30B 3/00
[58] Field of Search..................... 425/337, 363, 367

[56] References Cited
UNITED STATES PATENTS

| | | | |
|---|---|---|---|
| 2,513,541 | 7/1950 | Winegar et al. | 425/367 |
| 3,570,054 | 3/1971 | Seanor et al. | 425/337 |
| 3,611,486 | 10/1971 | Fox | 425/363 |
| 3,754,849 | 8/1973 | Fox | 425/363 |
| 3,840,315 | 10/1974 | Fidler et al. | 425/367 |

Primary Examiner—J. Howard Flint, Jr.
Attorney, Agent, or Firm—Donald D. Jeffery

[57] ABSTRACT

A material guide jaw, for two co-operating rolls of a rolling mill or calender, particularly for processing rubber or synthetic plastics material, comprising a jaw plate which forms a guide for the material and is so mounted on an intermediate plate which is mounted on a base plate that the jaw plate can be adjusted in three different ways while remaining in the same plane. Thus the base plate is displaceable at right-angles to the plane of the axes of the two roll spindles and carries a pivot shaft which is so secured in bearing lugs on the base plate as to prevent longitudinal displacement of the pivot shaft; the intermediate plate is mounted on the pivot shaft and is longitudinally movable thereon for adjustment in a direction transverse to the direction in which the base plate is displaceable; and the jaw plate, one face of which forms the guide surface for the material which is to be processed in the rolling mill or calender, is mounted on the intermediate plate for rotation with respect to the intermediate plate about a pivot axis located at a middle part of the intermediate plate and extending perpendicular to the plane of the intermediate plate.

4 Claims, 6 Drawing Figures

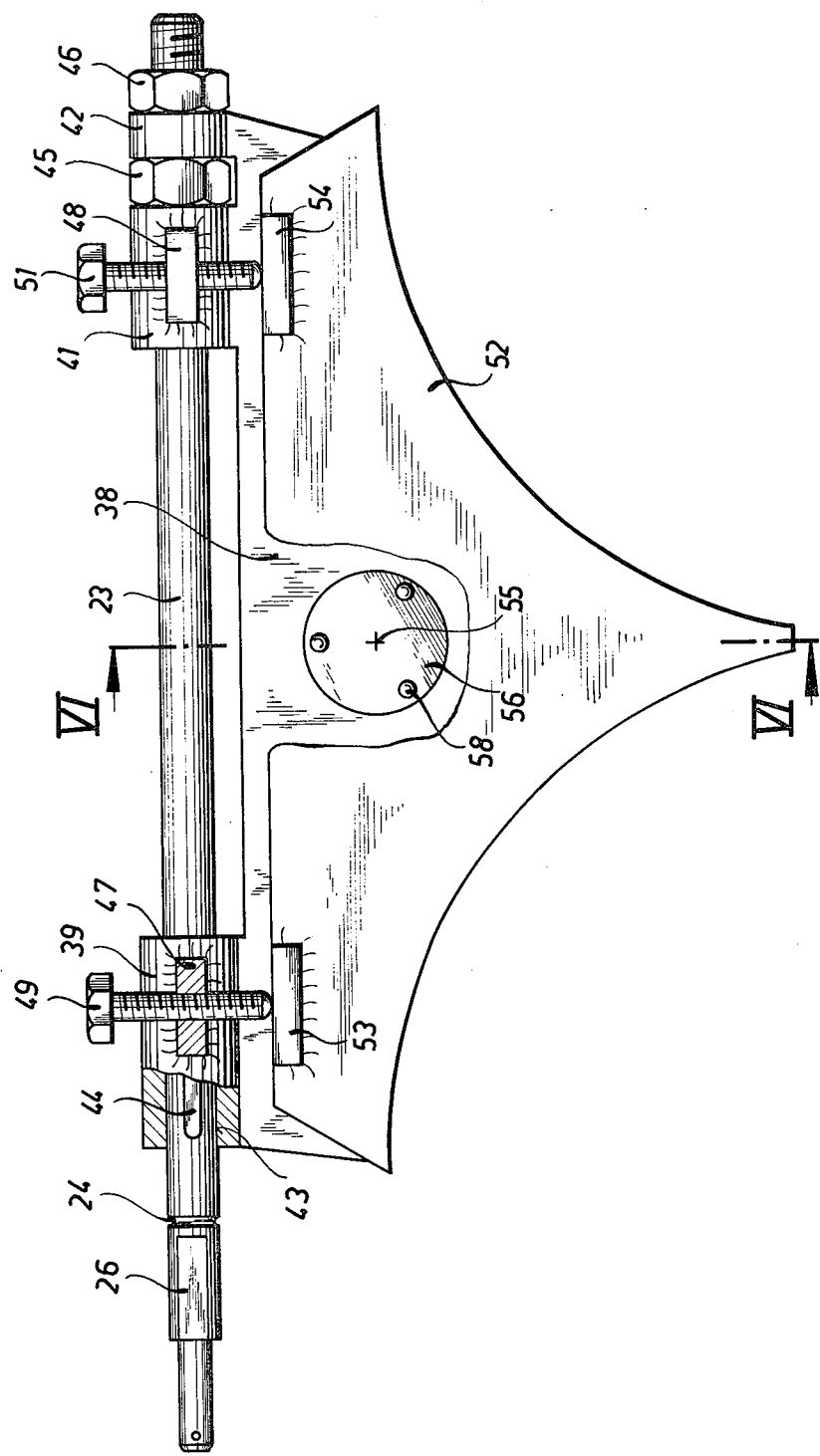

MATERIAL GUIDE JAW FOR TWO CO-OPERATING ROLLS OF A ROLLING MILL OR CALENDER

The invention relates to a material guide jaw for two co-operating rolls of a rolling mill or calender, particularly a rolling mill or calender for processing rubber or synthetic plastics material.

Material guide jaws have been proposed to protrude into the roll gap of a pair of working rolls in order to prevent lateral emergence of the material being processed. It is desirable for the material guide jaws, which are adapted in shape to the curvature of the rolls, to be mounted with the least possible clearance from the surface of the rolls. For this, it is known to mount the material guide jaws so that they are displaceable at right-angles to the plane of the axis of the rolls.

If one roll of a pair of rolls is adjusted so that it is positioned obliquely to the other roll, it becomes difficult to adapt the material guide jaw to the two roll ends. This is particularly the case where the oblique positioning of one roll and a parallel vertical adjustment of the other roll is involved, an arrangement which is quite usual in a multi-roll calender. Since the previously proposed displaceable material guide jaws can only be adequately close to the roll surfaces over a very small distance, lateral emergence of material cannot be prevented.

From U.S. Pat. No. 2,513,541, it is known to use spring pressure to press a two-part material guide jaw to the ends of a pair of rolls. The gap between the two parts of the jaw is covered by a cover plate, attached on one side and which terminates in a wedge extending into the roll gap. Such a two-part material guide jaw offers no uniform guide surface for the material which is to be guided and material settles in the gap alongside the cover plate, remains there, carbonises and results in a dirtying of the finished product. It is thus frequently necessary to clean the material guide jaw. A further disadvantage of such a construction resides in the fact that when the rolls are moved, the material guide jaw no longer rests in closely fitting fashion on the roll surfaces. Furthermore, the sealing face of the cover plate is no longer aligned with the sealing face of the part of the jaw which is not connected to the cover plate. The result is lateral emergence of the material which is to be processed.

In the case of a construction of material guide jaw which is known from U.S. Pat. No. 3,570,054, intended for a pair of rolls one of which is fixed, the material guide jaw with a single plate is movable substantially tangentially with respect to the surface of the fixed roll.

The invention is based on the problem of providing a material guide jaw having an uninterrupted guide face, the material guide jaw, in the case of a simple embodiment, guaranteeing a form of sealing-tightness which when both rolls of a pair of rolls are adjusted, is always closely fitting, preventing the lateral emergence of material.

According to the invention, there is provided a material guide jaw, for two co-operating rolls of a rolling mill or calender, comprising a base plate which is displaceable at right-angles to the plane of the axes of the two roll spindles and carries a pivot shaft which is so secured in bearing lugs on the base plate as to prevent longitudinal displacement of the pivot shaft; an intermediate plate mounted on the pivot shaft and longitudinally movable thereon for adjustment in a direction transverse to the direction in which the base plate is displaceable; and a jaw plate, one face of which forms a guide surface for the material which is to be processed in the rolling mill or calender, the jaw plate being mounted on the intermediate plate for rotation with respect to the intermediate plate about a pivot axis located at a middle part of the intermediate plate and extending perpendicular to the plane of the intermediate plate.

Thus the jaw plate of the material guide jaw can be moved for adjustment in three different ways, namely movement at right-angles to the plane of the axes of the rolls, lateral movement and pivoting movement about a pivot point, while remaining in the same plane and this permits an ever-accurate adaptation to a pair of rolls, even when both rolls are adjustable.

Advantageously the base plate has, on both sides of its middle part, slotted apertures through which pass guide bolts engaged in a fixed carrier and mounting the base plate displaceably on the fixed carrier, the base plate being connected on its edge remote from the roll gap, to an adjusting spindle which is engaged with the fixed carrier.

In this way, it is possible easily to adjust the material guide jaw at right-angles to the plane of the axes of the rolls.

Advantageously the jaw plate is mounted for rotation on the intermediate plate by means of a shouldered disc engaged in a stepped bore at the middle part of the intermediate plate, the disc being bolted to the jaw plate, the intermediate plate having on either side of its middle part projections in which adjusting screws are screw threadedly engaged, ends of the adjusting screws bearing against projections on the jaw plate.

Stepless pivoting of the jaw plate can be achieved by rotating the adjusting screws.

In order to permit rapid and easy cleaning of the material guide jaws, the intermediate plate can be secured on the pivot shaft against rotation with respect thereto and one end of the pivot shaft has a square tang on which a pivot lever is disposed, the pivot lever being displaceable longitudinally of the pivot shaft against a thrust spring to free the lever from a stop and permit pivoting movement thereof to rotate the pivot shaft and thereby to pivot the intermediate plate and jaw plate together with respect to the base plate about the axis of the pivot shaft.

The invention is diagrammatically illustrated by way of example in the attached drawings, in which:

FIG. 5 shows the intermediate plate with a connected jaw plate, the jaw plate being shown partly broken away in the region of the pivot point.

Figure 1:
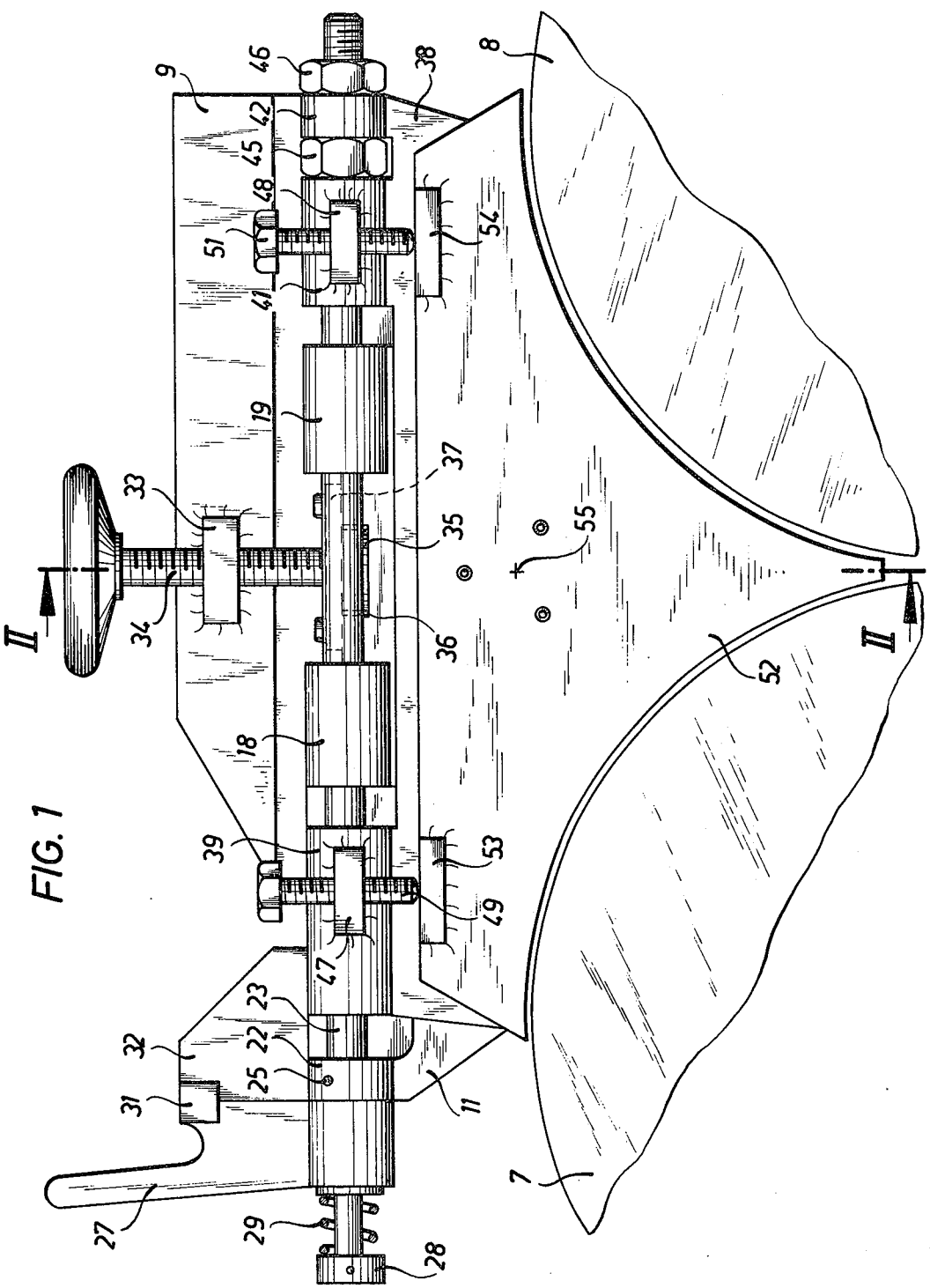
FIG. 1 shows a material guide jaw according to the invention extending into the roll gap of a pair of rollers.
Figure 2:
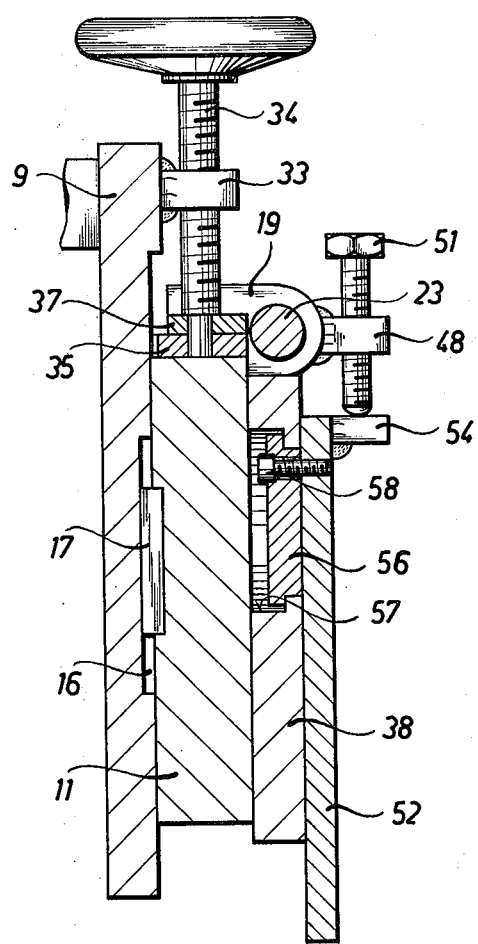
FIG. 2 shows a sectional side view of the material guide jaw taken on line II—II of FIG. 1.

Referring to the drawings, a material guide jaw has a jaw plate 52 which extends into the roll gap of a pair of rolls 7, 8 such that material being calendered is contained against outward lateral movement beyond the adjacent end of each of the rolls 7 and 8 by the face of the jaw plate visible in FIG. 1. A material guide jaw is provided at each end of the pair of rolls 7 and 8. The roll 7 is so mounted that it is adapted for parallel adjustment in the roll spindle plane and can also be obliquely adjusted in the vertical direction. The roll 8 is adapted for parallel height adjustment (FIG. 1). Between the material guide jaw plate 52 and the roll surfaces is a small clearance which must be retained in order to avoid damage to the roll surfaces.

Figure 3:
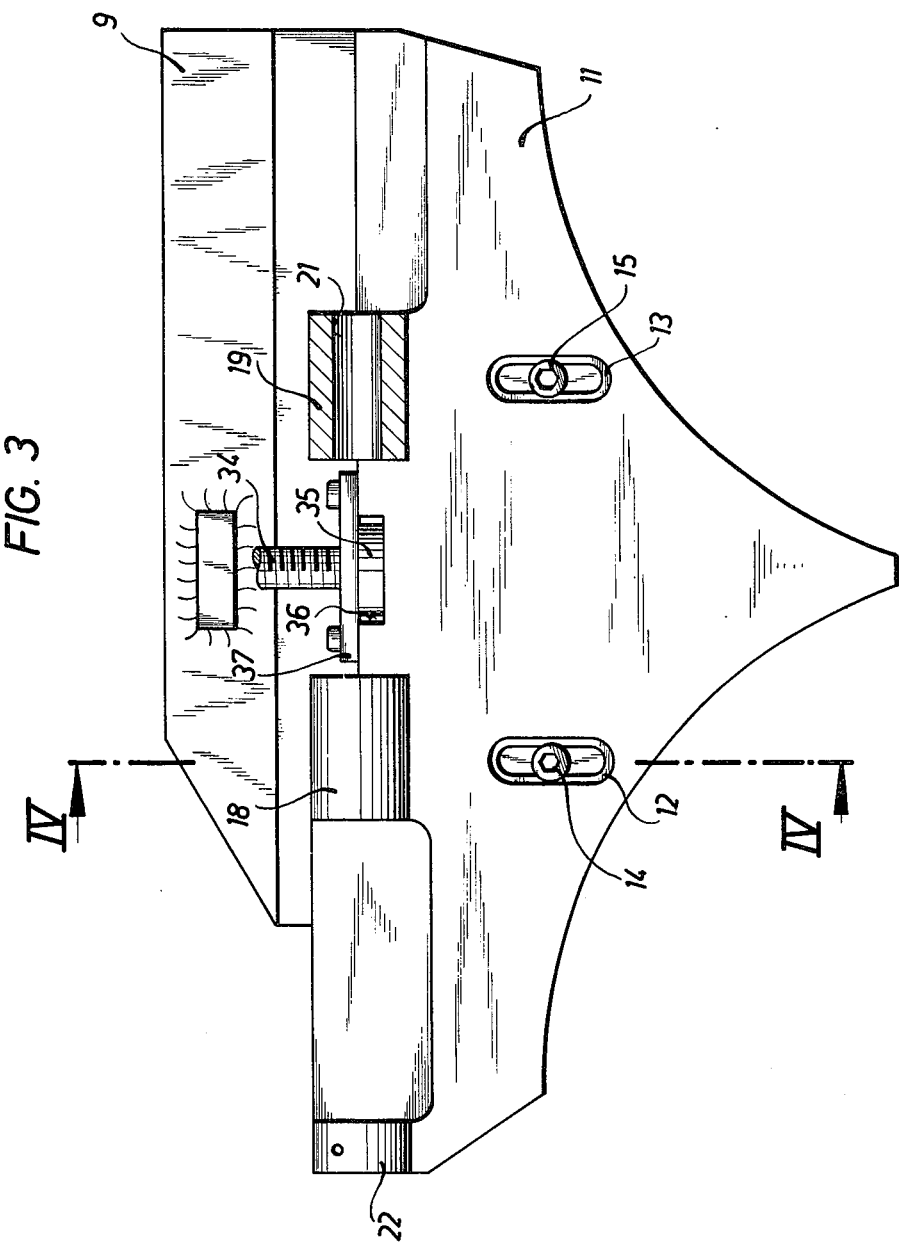
FIG. 3 shows a base plate of the material guide jaw of FIGS. 1 and 2, adjustable on a fixed carrier, an intermediate plate and a guide plate as well as a locking device having been omitted from the drawings.
Figure 4:
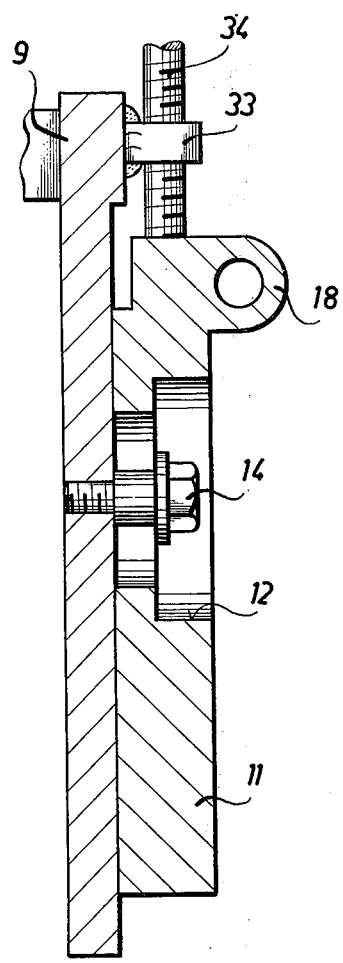
FIG. 4 is a sectional side view taken on line IV—IV of FIG. 3.
Figure 6:
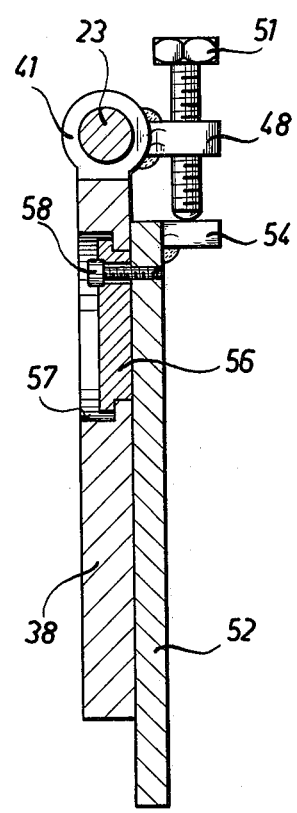
FIG. 6 is a side view taken on line VI—VI of FIG. 5.

The material guide jaw has three movable plates. These are a base plate 11, an intermediate plate 38 and the jaw plate 52. A carrier 9 is rigidly connected to a calender stand, (not shown), and mounts the base plate 11. The base plate 11 is mounted on the carrier 9 by two guide bolts 14 and 15 disposed one on either side of a centre line of the base plate 11, the guide bolts 14 and 15 engaging through vertically elongated holes in the base plate 11 and having their heads recessed into the base plate 11 in recesses 12 and 13 (FIGS. 3 and 4). A vertically extending groove 16 is machined into the fixed carrier plate 9 at a middle part thereof and receives a key 17 engaged in the base plate 11, thereby to constrain the base plate for only vertical movement with respect to the carrier 9.

Integrally cast on the top edge of the base plate 11 are two bearing lugs 18 and 19 through which extends a bearing bore 21. At the left-hand end of the base plate, as viewed in FIG. 1, is a further bearing lug 22, having a bore therein aligned with the bore in the two aforementioned bearing lugs 18 and 19. A pivot shaft 23 is rotatable in the bearing lugs 18, 19 and 22.

The pivot shaft 23 is secured against longitudinal displacement with respect to the base plate 11 by a pin 25 engaged in a peripherally extending groove 24 in the shaft 23 and inserted in the left-hand bearing lug 22 of the base plate 11. The pivot shaft 23 has an adjacent square portion 26 on which a pivoting lever 27 is displaceably mounted against a thrust spring 29 bearing against an end ring 28. In the condition illustrated, the pivoting lever 27 has a projection 31 bearing on a retaining projection 32 on the carrier 9 and so forms a device for locking the material guide jaw.

In its middle portion, the base plate 11 is connected to an adjusting spindle 34 which is engaged in a screw threaded bore in a projection 33 on the fixed carrier 9. A stepped end of the spindle 34 on which an abutment ring 35 is pinned, extends into a recess 36 in the base plate 11. The adjusting spindle 34 passes through a retaining tongue 37 which is screwed over the recess 36. By rotating the spindle 34 the base plate 11 can be moved up and down with respect to the fixed carrier 9.

Lying against the base plate 11 is the intermediate plate 38 which is supported in longitudinally movable fashion on the pivot shaft 23 by means of bearing lugs 39, 41 and 42. A bearing bore 43 in the left-hand bearing lug 39 has a key way therein which receives a key 44 (FIG. 5), which also extends into the pivot shaft 23, and prevents rotation of the intermediate plate 38 about the pivot shaft 23. The right-hand end of the pivot shaft 23 is screw threaded and on either side of the outer right-hand bearing lug 42 of the intermediate plate 38 are nuts 45 and 46 which can be rotated to effect longitudinal adjustment of the intermediate plate 38, that is to say movement with respect to the pivot shaft 23 and parallel to the axis of the pivot shaft 23.

The left-hand bearing lug 39 and the inner right-hand bearing lug 41 carry horizontally extending welded on supports 47, 48 having screw threaded bores therein into which adjusting screws 49 and 51 are screwed, the ends of these screws pressing on abutment faces 53 and 54 of lugs welded at right-angles on the jaw plate 52. The jaw plate 52 is mounted on the intermediate plate 38 by means of a flanged disc 56 engaged in a stepped bore 57 in the intermediate plate 38 and secured to the jaw plate 52 by screws 58. The jaw plate 52 can thus pivot about a pivot axis 55 (FIG. 1) which extends perpendicular to the plane of the jaw plate 52.

The material guide jaw operates in the following way:

If the roll 7 is adjusted obliquely in that its end which is adjacent the material guide jaw shown is moved away from the material guide jaw, then the material guide jaw is adapted to the new position of the end of the roll by slackening the nut 46 and moving the intermediate plate 38 leftwardly, as viewed in FIG. 1, by rotation of the nut 45. By lowering the adjusting screw 49 and raising the adjusting screw 51, the jaw plate 52, which actually comes into contact with the material to be processed, is pivoted to the left about the pivot axis 55. Via the adjusting spindle 34, the base plate 11 is moved downwardly into the roll gap. The material guide jaw (not shown) at the other end of the roll is of similar but oppositely handed opposite construction and is moved upwardly by the adjusting spindle 34 prior to the oblique adjustment of the roll 7. Here, the intermediate plate 38 is moved rightwardly by rotating the nut 45 in the opposite direction and the jaw plate 52 is pivoted to the right by lowering the adjusting screw 51 and raising the adjusting screw 49. The base plate 11 is then adjusted in the direction of the roll gap via the adjusting spindle 34 and the material guide jaws are again adapted to the new position of the rolls.

If, in addition to the oblique adjustment of the roll 7, the roll 8 also undergoes parallel height adjustment, e.g. towards a further calender roll situated below it, then adaptation of the material guide jaw to the roll adjustment can be effected via the vertical displacement, lateral displacement and finally pivoting of the jaw plates. The material guide jaw can thus always be adjusted so that it fits into the roll gap parallel with the roll surfaces, a small clearance always being retained.

By pressing the lever 27 leftwardly as viewed in FIG. 1 against the force of the spring 29, the projection 31 can be moved clear of the projection 32 of the carrier 9 so that the lever can rotate the pivot shaft 23, and thereby, due to the key 44, swing the intermediate plate 38 and jaw plate 52 out of the roll gap.

I claim:

1. A material guide jaw for two co-operating rolls having a roll gap therebetween into which material to be processed can be fed, the material guide jaw comprising a fixed carrier, a base plate mounted on said fixed carrier in such manner that the base plate is displaceable at right-angles to the plane of the axes of the two rolls, a pivot shaft, bearing lugs on the base plate mounting the pivot shaft in a manner to prevent longitudinal displacement of the pivot shaft with respect to the base plate, an intermediate plate mounted on said pivot shaft and longitudinally movable thereon for adjustment in a direction transverse to the direction in which said base plate is displaceable; and a jaw plate, one face of which jaw plate forms a guide surface for the material which is to be processed, said jaw plate being mounted on the intermediate plate for rotation with respect to said intermediate plate about a pivot axis located at a middle part of said intermediate plate and extending perpendicular to the plane of said intermediate plate.

2. A material guide jaw as claimed in claim 1, wherein said base plate is formed to present, on both sides of its middle part, slotted apertures through which pass guide bolts engaged in said fixed carrier and mounting the base plate displaceably on said fixed carrier, said base plate being connected, on an edge thereof remote from said roll gap, to an adjusting spindle which is engaged with said fixed carrier.

3. A material guide jaw as claimed in claim 1, wherein said jaw plate is mounted for rotation on said intermediate plate by means of a shouldered disc engaged in a stepped bore at the middle part of the intermediate plate, said shouldered disc being bolted to said jaw plate, said intermediate plate having on either side of a middle part thereof projections in which adjusting screws are screw threadedly engaged, ends of said adjusting screws bearing against projections on said jaw plate.

4. A material guide jaw as claimed in claim 1, wherein said carrier plate is secured on said pivot shaft against rotation with respect thereto and one end of said pivot shaft is formed to a square tang on which a pivot lever is disposed, said pivot lever being displaceable longitudinally of said pivot shaft against a thrust spring to free said pivot lever from a stop and permit pivoting movement thereof to rotate said pivot shaft and thereby to pivot said intermediate plate and said jaw plate together with respect to said base plate about the axis of said pivot shaft.

\* \* \* \* \*